(12) United States Patent
Friedrich et al.

(10) Patent No.: US 11,167,748 B2
(45) Date of Patent: Nov. 9, 2021

(54) METHOD FOR DEPARTING FROM A RECUPERATION PHASE IN A PARALLEL HYBRID VEHICLE

(71) Applicant: Bayerische Motoren Werke Aktiengesellschaft, Munich (DE)

(72) Inventors: Michael Friedrich, Eching (DE); Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 272 days.

(21) Appl. No.: 16/264,398

(22) Filed: Jan. 31, 2019

(65) Prior Publication Data

US 2019/0168743 A1 Jun. 6, 2019

Related U.S. Application Data

(63) Continuation of application No. PCT/EP2017/068756, filed on Jul. 25, 2017.

(30) Foreign Application Priority Data

Aug. 1, 2016 (DE) ...................... 10 2016 214 148.1

(51) Int. Cl.
*B60W 20/40* (2016.01)
*B60K 6/48* (2007.10)
(Continued)

(52) U.S. Cl.
CPC ............... *B60W 20/40* (2013.01); *B60K 6/30* (2013.01); *B60K 6/387* (2013.01); *B60K 6/48* (2013.01);
(Continued)

(58) Field of Classification Search
CPC ............... B60W 20/40; B60W 10/10; B60W 30/18127; B60W 10/08; B60W 20/00;
(Continued)

(56) References Cited

U.S. PATENT DOCUMENTS 6,887,180 B2  5/2005  Pels et al.
2002/0177504 A1*  11/2002  Pels ...................... B60K 6/387
  477/3

FOREIGN PATENT DOCUMENTS

CN  1378924 A  11/2002
CN  103648878 A  3/2014
(Continued)

OTHER PUBLICATIONS

PCT/EP2017/068756, International Search Report dated Oct. 23, 2017 (Two (2) pages).
(Continued)

*Primary Examiner* — Michael V Kerrigan
(74) *Attorney, Agent, or Firm* — Crowell & Moring LLP

(57) ABSTRACT

A method for exiting from a recuperation phase in a parallel hybrid vehicle includes, in a first step, the vehicle is in a recuperation phase, started by means of a trigger, with a predefined recuperation driving demand, and, in a second step, the electric machine is brought to an increased rotational speed during the recuperation phase. In a third step, a phase for departing from the recuperation phase is started by means of a trigger, wherein, in this phase, the internal combustion engine is made available for coupling to the electric machine, such that a target rotational speed determined between the internal combustion engine to be connected and the electric machine for the connection to the transmission input is set, and in parallel, by means of an upshift, a highest possible gear ratio for the connection to the drivetrain is set, in order to satisfy a present driving demand.

(Continued)

In a fourth step, the departure from the recuperation phase is completed.

19 Claims, 1 Drawing Sheet

(51) Int. Cl.
| | | |
|---|---|---|
| *B60W 10/02* | (2006.01) | |
| *B60W 20/30* | (2016.01) | |
| *B60W 10/10* | (2012.01) | |
| *F02N 11/08* | (2006.01) | |
| *B60W 30/18* | (2012.01) | |
| *B60W 10/08* | (2006.01) | |
| *B60W 20/00* | (2016.01) | |
| *F02N 15/02* | (2006.01) | |
| *B60W 10/06* | (2006.01) | |
| *B60K 6/30* | (2007.10) | |
| *B60K 6/387* | (2007.10) | |
| *B60W 10/11* | (2012.01) | |

(52) U.S. Cl.
CPC ............ *B60W 10/02* (2013.01); *B60W 10/06* (2013.01); *B60W 10/08* (2013.01); *B60W 10/10* (2013.01); *B60W 10/11* (2013.01); *B60W 20/00* (2013.01); *B60W 20/30* (2013.01); *B60W 30/18127* (2013.01); *F02N 11/0822* (2013.01); *F02N 15/02* (2013.01); *B60K 2006/4825* (2013.01); *B60W 2520/10* (2013.01); *B60W 2540/10* (2013.01); *B60W 2540/12* (2013.01); *B60W 2710/021* (2013.01); *B60W 2710/0644* (2013.01); *B60W 2710/1005* (2013.01); *B60W 2710/1011* (2013.01); *B60Y 2200/92* (2013.01); *F02N 2200/041* (2013.01); *F02N 2200/0801* (2013.01); *F02N 2200/101* (2013.01); *F02N 2200/102* (2013.01); *Y02T 10/62* (2013.01); *Y02T 10/70* (2013.01)

(58) Field of Classification Search
CPC ...... B60W 10/06; B60W 10/11; B60W 10/02; B60W 20/30; B60W 2710/0644; B60W 2710/1011; B60W 2710/021; B60W 2520/10; B60W 2540/10; B60W 2540/12; B60W 2710/1005; F02N 11/0822; F02N 15/02; F02N 2200/102; F02N 2200/0801; F02N 2200/101; F02N 2200/041; B60K 6/30; B60K 6/387; B60K 6/48; B60K 2006/4825; Y02T 10/62; Y02T 10/70; Y02T 10/40; B60Y 2200/92

See application file for complete search history.

(56) References Cited

FOREIGN PATENT DOCUMENTS

| | | |
|---|---|---|
| DE | 102 09 514 A1 | 10/2002 |
| DE | 10 2004 023 673 A1 | 12/2005 |
| DE | 10 2011110 979 A1 | 2/2013 |
| DE | 11 2013 000 337 T5 | 8/2014 |
| DE | 10 2015 109 605 A1 | 1/2016 |
| DE | 10 2015 113 713 A1 | 3/2016 |
| DE | 10 2014 214 617 B4 | 4/2017 |
| DE | 10 2014 214 614 B4 | 7/2017 |
| GB | 2 413 998 A | 11/2005 |

OTHER PUBLICATIONS

German Search Report issued in German counterpart application No. 10 2016 214 148.1 dated Jun. 5, 2018, with Statement of Relevancy (Seven (7) pages).

German-language European Office Action issued in European application No. 17 743 331.5-1012 dated Feb. 13, 2020 (Nine (9) pages).

Radu Bojoi et al., "Design Trade-off and Experimental Validation of multiphase starter generators for 48V mini-hybrid powertrain", *IEEE*, Dec. 17, 2014, (Seven (7) pages).

Chinese Office Action issued in Chinese application No. 201780044250.7 dated Jun. 29, 2021, with English translation (Eighteen (18) pages).

\* cited by examiner

METHOD FOR DEPARTING FROM A RECUPERATION PHASE IN A PARALLEL HYBRID VEHICLE

CROSS REFERENCE TO RELATED APPLICATIONS

This application is a continuation of PCT International Application No. PCT/EP2017/068756, filed Jul. 25, 2017, which claims priority under 35 U.S.C. § 119 from German Patent Application No. 10 2016 214 148.1, filed Aug. 1, 2016, the entire disclosures of which are herein expressly incorporated by reference.

BACKGROUND AND SUMMARY OF THE INVENTION

The invention relates to a method for exiting a recuperation phase in a parallel hybrid vehicle.

In current hybrid applications, in particular parallel (P2) hybrid applications, it is attempted to make the exiting from the recuperation phase as rapid and free of jolts as possible, i.e. to optimize the operating strategy for connecting the internal combustion engine. This applies both to high voltage hybrids with voltages of >60V and to low voltage hybrids with a voltage of <60V, e.g. 48V in future applications.

In previous operating strategies, the trigger for starting the internal combustion engine has been a load request on the accelerator pedal. In this context, the decoupled internal combustion engine is started from the rotational speed of zero by means of a suitable starting system by means of a cranked start or pinion starter, and is subsequently brought to the corresponding connection rotational speed for the output by burning fuel. The internal combustion engine is coupled to the drive train via the clutch and can contribute to the acceleration of the vehicle only after this. The time period which occurs here without sufficient implementation of the load request of the driver and without high consumption of electrical energy, which is available only to a limited degree, in particular in the case of low-voltage systems, for bridging until the acceptance of the load by the internal combustion engine gives rise to functional deficits and to vehicle reactions in terms of the driver requests which can be accepted only with difficulty or cannot be accepted. As an alternative to this method, the internal combustion engine could remain coupled in braking phases, as a result of which the starting time would be eliminated, but the recuperation potential would also be reduced by the drag torque which would be present.

The abovementioned operating strategies have come to be adopted, for example, by German series manufacturers, wherein a multiplicity of patent applications and patents are present in the fields of recuperation, start/stop and coupling of the internal combustion engine.

On the basis of what has been specified above, an object of this invention is to make available a method which shortens the time period without sufficient implementation of the load request of the driver and without a high consumption of electrical energy. This object is achieved according to the invention by means of the features of the independent patent claims. Advantageous refinements are the subject matter of the dependent claims.

The method according to the invention can be used with the same effect also with different topologies of a parallel hybrid vehicle, i.e. not only in the P2 system but also in the case of a momentum start apparatus, as described in patent No. DE102014214614 B4 and patent No. DE102014214617 B4, both from BMW AG. In the latter, in addition to the at least necessary clutch, a device is made available which permits coupling of the internal combustion engine to the electric machine, or in other systems which are suitable owing to their mechanical properties. For different topologies it is then necessary to take into account the mechanical conditions for coupling and decoupling.

A method is proposed for exiting a recuperation phase in a parallel hybrid vehicle comprising an internal combustion engine and an electric machine which can be coupled thereto via a clutch with interaction with a device for shock isolation, comprising at least one flywheel mass and one second clutch, which electric machine can be connected to a transmission which is connected to a drive train, wherein the internal combustion engine can be completely decoupled from the electric machine by means of the clutch, and wherein in a first step, the vehicle is in a recuperation phase, started by a trigger, with a predefined recuperation driving request, and in a second step the electric machine is brought to an increased rotational speed during the recuperation phase. In a third step, a phase for exiting the recuperation phase is started by a trigger, wherein in this phase the internal combustion engine is made available for coupling to the electric machine in that the second clutch is opened, and when the latter is open, the clutch is closed, with the result that the start of the internal combustion engine is carried out as a pulse start in such a way that a target rotational speed which is determined between the internal combustion engine which is to be connected and the flywheel mass for connecting to the transmission input is set, and in parallel a maximum possible gearspeed for connecting to the drive train is set by means of a gearspeed upshift, in order to satisfy a present driving request. In a fourth step, the second clutch is closed in a completely controlled fashion, with the result that the exit from the recuperation phase is completed.

In addition, a method is proposed for exiting a recuperation phase in a parallel hybrid vehicle comprising an internal combustion engine and an electric machine which can be coupled thereto via a clutch and which can be connected to a transmission which is connected to a drive train, wherein the internal combustion engine can be completely decoupled from the electric machine by means of the clutch, and wherein in a first step, the vehicle is in a recuperation phase, started by a trigger, with a predefined recuperation driving request, and in a second step, the electric machine is brought to an increased rotational speed during the recuperation phase. In a third step, a phase for exiting the recuperation phase is started by a trigger, wherein in this phase the internal combustion engine is made available for coupling to the electric machine, controlled closing of the clutch and application of positive torque in the electric machine take place with the result that the start of the internal combustion engine is carried out as a supported pulse start in such a way that a target rotational speed which is determined between the internal combustion engine to be connected and the electric machine is set for connecting to the transmission input and in parallel a maximum possible gearspeed for connecting to the drive train is set by means of a gearspeed upshift, in order to satisfy a driving request which is present. In a fourth step, the clutch is closed completely, with the result that the exit from the recuperation phase is completed.

Recuperation driving request and driving request are understood to be the request to change the driving behavior which is passed onto the vehicle controller via the trigger. For example, the request that braking is to be carried out or braking is no longer to be carried out, and how strong the braking or the release for the brake is to be, is communicated by activating the brake pedal, that is to say by pressing or releasing the brake pedal. In addition, releasing the brake pedal is a request to reduce the speed without braking.

The phase for exiting the recuperation phase starts with the activation of the trigger and ends with the closing of the clutch or opening of the second clutch.

In addition, it is proposed that the trigger for entering the recuperation phase is activation of the brake pedal, and in order to exit the recuperation phase the trigger is a reduction in or termination of the activation of the brake pedal, activation of accelerator pedal or an undershooting of a speed threshold.

In addition, it is proposed that in the P2 system, in the third step, in the phase for exiting the recuperation phase, the controlled closing of the clutch is carried out by placing the clutch in a slipping state.

By means of the proposed method with the possibility of using different triggers for entering and/or exiting the recuperation phase, and by already making available the internal combustion engine at the start of the phase for exiting the recuperation phase, i.e. before a further driving request, e.g. an acceleration request, takes place, more rapid satisfaction of the driver's wish with simultaneous jolt-free coupling between the internal combustion engine and the electric machine is ensured.

In addition it is proposed, in the P2 system, in the fourth step, in the case of the driving request of an overrun upshift, the clutch is closed with a coupling rotational speed between the internal combustion engine and the electric machine below the target rotational speed of the new gearspeed, and in the case of the driving request of a traction request with a coupling rotational speed between the internal combustion engine and electric machine above the target rotational speed of the new gearspeed said clutch is closed.

In addition, it is proposed that, in the P2 system, in the third step, for the assisted pulse start the kinetic energy from the pulse of the electric machine in conjunction with involved transmission components and the available torque of the electric machine are used.

In addition, it is proposed that at the entry into the recuperation phase one or more gearspeed downshifts are carried out to a gearspeed below the gearspeed which is at least intended for the re-coupling of the internal combustion engine.

By means of the specified measures, a coupling which is comfortable, i.e. jolt-free, for the driver can take place between the internal combustion engine and the machine.

In addition it is proposed that during the recuperation phase adjustment of the gearspeed is carried out in such a way that the at least necessary kinetic energy of the electric machine is kept available in order to implement the pulse start request. It is therefore ensured that a supported pulse start can be carried out at any time and without delay.

In addition, a parallel hybrid vehicle is proposed comprising an internal combustion engine and an electric machine which can be coupled thereto via a clutch and which is connected to a transmission which is connected to a drive train, wherein the internal combustion engine can be completely decoupled from the electric machine by means of the clutch, in each case at least one sensing device, control device and execution device which are configured to sense a trigger for entering and exiting a recuperation phase, and transmitting, receiving and processing signals, in order to carry out the method proposed.

In addition, a parallel hybrid vehicle is proposed comprising an internal combustion engine and an electric machine which can be coupled thereto via a clutch with interaction with a device for shock isolation, comprising at least one flywheel mass and one second clutch, which electric machine is connected to a transmission which is connected to a drive train, wherein the internal combustion engine can be completely decoupled from the electric machine by means of the clutch with interaction with the device for shock isolation, in each case at least one sensing device, control device and execution device which are configured to sense a trigger for entering and exiting the recuperation phase, and transmitting, receiving and processing signals, in order to carry out the method proposed.

Further features and advantages of the invention can be found in the following description of exemplary embodiments of the invention, and with reference to the figures of the drawing which shows details according to the invention, and from the claims. The individual features can each be implemented individually per se or a plurality thereof can be implemented in any desired combination in a variant of the invention.

Preferred exemplary embodiments of the invention are explained in more detail below with reference to the appended drawing.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
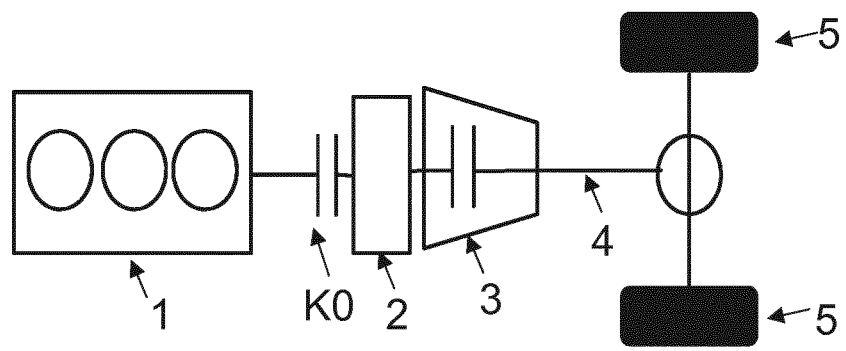
FIG. 1 shows a typical topology of a parallel hybrid arrangement according to the prior art.
Figure 2:
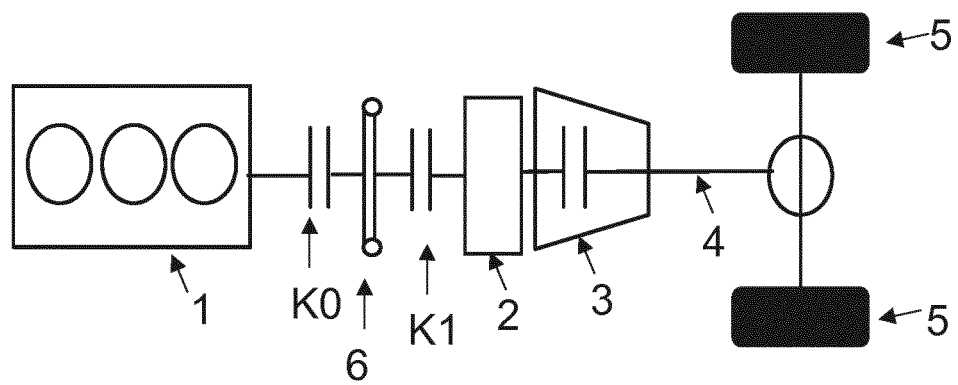
FIG. 2 shows a further typical topology of a parallel hybrid arrangement according to the prior art.

FIGS. 1 and 2 show a typical topology of a parallel hybrid arrangement according to the prior art. The illustration comprises a typical topology of a transmission 3, which can be shifted in a automated fashion in a plurality of gearspeeds, in a motor vehicle, preferably of a hybrid vehicle, having a conventional internal combustion engine (VM) 1 in combination with an electric machine (EM) 2 in a P2 arrangement (FIG. 1) and/or with a momentum start module (FIG. 2), that is to say a parallel hybrid arrangement. The electric machine EM2 can be coupled to the internal combustion engine VM1 or decoupled therefrom by means of the clutch K0 on the basis of a predefined operating strategy. The electric machine EM2 is connected to the transmission 3 which can be shifted in an automated fashion in a plurality of gearspeeds and which can be a planetary gear mechanism, double clutch transmission a CVT (continuously variable transmission) or some other type of transmission which can be shifted in an automated fashion in a plurality of gearspeeds. The transmission 3 is in turn connected to the drive train 4 for driving one or more wheels 5 of the hybrid vehicle.

As described above, in known methods the exiting from a recuperation phase is normally triggered by means of the accelerator pedal, i.e. the internal combustion engine VM1 is first switched on when the accelerator pedal is operated, i.e. there is an active running up of the internal combustion engine VM1. This gives rise to a delay in the availability of the engine torque and therefore in the response to the driver's request. Furthermore, this method is not optimal for low-voltage on-board power systems, e.g. on-board power systems based on e.g. 48V, since a very large amount of electrical energy is required for coupling the internal combustion engine VM1. This does not constitute a problem in high voltage systems, since they have sufficient power to implement the driver's request "acceleration". However, it is disadvantageous that high voltage systems take up a very large amount of space and are heavy. Therefore, a different strategy has to be found for future applications in the low voltage range.

As is shown in FIG. 1, it is possible to provide just one clutch K0 for decoupling and coupling the internal combustion engine VM1 to the electric machine EM2, which can be referred to as a P2 hybrid. In FIG. 2, an extension of the P2 system to form a momentum start apparatus, i.e. a system with flywheel storage apparatus and flywheel mass is shown. This system has, in addition to the clutch K0 which always has to be directly arranged on the internal combustion engine VM1 since this clutch K0 serves for coupling or decoupling the internal combustion engine VM1, a device for shock isolation K1 and 6 which is formed as a momentum start apparatus. This device for shock isolation has at least one flywheel mass 6 and a second clutch K1, wherein the flywheel mass is arranged between the clutch K0 and the second clutch K1. The second clutch K1 serves to couple the electric machine EM2 to the internal combustion engine VM1 via the flywheel mass 6 with virtually complete shock decoupling. It is therefore an intermediate step for coupling the electric machine EM2 to the internal combustion engine VM1 in comparison with the P2 system which ensures an improvement of the coupling, to be more precise a reduction in the shock during coupling. Therefore, the coupling becomes even more comfortable for the driver, since the jolt during coupling is eliminated.

Figure 3:
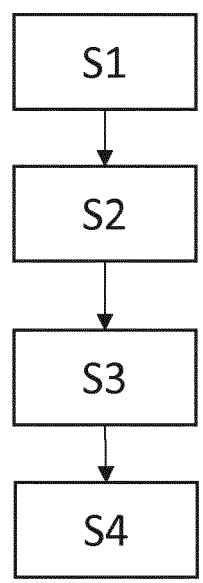
FIG. 3 shows a flow diagram of the method according to an embodiment of the present invention.

FIG. 3 shows a flow diagram of the method according to both embodiments of the present invention. The objective of the proposed method is to shorten significantly the time period without sufficient implementation of the load request of the driver and without high consumption of electrical energy, as described above, and therefore to permit or improve the use of a P2 system or of a momentum start apparatus, that is to say of a parallel hybrid system, on a low voltage basis, that is to say e.g. on a 48 V basis. By means of the proposed method it is possible to comply with the driver's wish more quickly, and the consumption of electrical energy for propelling the vehicle can be limited.

In order to implement the method, in a first step S1 the trigger for deactivating or shutting down and starting the internal combustion engine VM1 is made a pedal position, e.g. the position of the brake pedal or else of the accelerator pedal or a speed threshold (for the exiting from the recuperation phase) which is undershot. The entry into the recuperation phase is initiated e.g. by depressing the brake pedal. In this context, the clutch K0 between the internal combustion engine VM1 and the electric machine EM2 is opened, and the internal combustion engine VM1 is shut down, i.e. switched off.

At the same time, in a second step S2, a plurality of gearspeed downshifts are carried out in the transmission 3. The gearspeed downshifts are carried out in such a way that the electric machine EM2 which is connected to the transmission input shaft is brought to a high rotational speed and therefore placed in the state of high kinetic energy. For this purpose, shifting back is preferably carried out by more gearspeeds than would be necessary for the braking operation. As a result, improved recuperation can be achieved, i.e. more energy is available at the end of the recuperation phase, in order e.g. to couple the internal combustion engine VM1. In a further step, the rotational speed difference from which at any time an engine start of the internal combustion engine VM1 can take place according to the known pulse start method by closing the clutch K0 will now be considered. During the recuperation phase, adjustment of the gearspeeds in the transmission 3, adapted to the deceleration of the vehicle, takes place in order to maintain the state of high kinetic energy in electric machine EM2. That is to say e.g. shifting down of the gearspeeds takes place in order to optimize the recuperation further.

The exiting from the recuperation phase is triggered in a third step S3 by releasing the brake pedal or undershooting a speed threshold or activating the accelerator pedal, also simultaneously with the brake pedal. This can be detected e.g. by a correspondingly present sensor system and be passed on for processing to e.g. a control unit. After the sensing of the start of the recuperation phase, the internal combustion engine VM1 is coupled to the electric machine EM2 again depending on which parallel hybrid system is used, that is to say P2 or momentum start apparatus. In the case of the P2 system shown in FIG. 1, i.e. the clutch is placed in the slipping state by controlled closing of the clutch K0, and the start of the internal combustion engine VM1 is carried out as a supported pulse start by applying positive torque in the electric machine EM2. The objective here is to carry out the pulse start in such a way that the rotational speed which is set between the connected internal combustion engine VM1 and the electric machine EM2 is set above the rotational speed for connecting to the output. The objective is therefore that a target rotational speed which is determined between the internal combustion engine VM1 to be connected and the electric machine EM2 for connecting to the transmission input is set, and in parallel a maximum possible gearspeed for connecting to the drive train 4 is set by means of a gearspeed upshift, in order to satisfy a driving request which is present.

In the case of the momentum start apparatus which is shown in FIG. 2, the second clutch K1 is opened, with the result that in an intermediate step the electric machine EM 2 is disconnected from the flywheel mass 6, but it is still decoupled from the internal combustion engine VM1 by means of the clutch K0. If the second clutch K1 is open, controlled closing of the clutch K0 takes place, with the result that the start of the internal combustion engine is carried out as a pulse start, a target rotational speed which is determined between the internal combustion engine VM1 to be connected and the flywheel mass 6 for connecting to the transmission input is set, and in parallel a maximum possible gearspeed for connecting to the drive train 4 is set by means of a gearspeed upshift, in order to satisfy a driving request which is present.

In parallel with the supported pulse start, the transmission 3 therefore carries out in both cases shifting up of the gearspeeds, preferably to a gearspeed above the gearspeed which is required to couple the internal combustion engine VM1. Therefore, at least the proportional implementation of the driver's wish is achieved by means of the friction shifting torques, wherein the objective is that the maximum possible gearspeed for connecting to the driver train 4 is reached above the idling rotational speed, i.e. the transmission input rotational speed is kept as low as possible.

Subsequently, in a fourth step S4, the complete frictional engagement between the internal combustion engine VM1, the electric machine EM2 and the output by closing the drive train, i.e. the clutch K0 in the P2 system or the second clutch K1 in the momentum start apparatus, is represented, and the recuperation phase is therefore ended.

In one example, the entering and the exiting of the recuperation phase are triggered by activating the brake pedal. As a result, the internal combustion engine VM1 is decoupled from the electric machine EM2 and therefore from the transmission 3, that is to say switched off, i.e. it does not supply any torque, by opening the clutch K0.

The kinetic energy of the electric machine EM2 is already raised at the start of the recuperation phase by shifting down the gearspeeds below the required gearspeed for the requested target rotational speed for recoupling the internal combustion engine VM1. During the recuperation phase, further adjustment takes place, that is to say e.g. shifting down, of the gearspeeds, where necessary, in order to keep the kinetic energy in the electrical machine EM2 as high as possible.

The exiting of the recuperation phase takes place in turn by means of a trigger, in this example by releasing the brake pedal. During the release of the brake pedal, in the P2 system the clutch K0 is placed in a slipping state in a controlled fashion and/or the second clutch K1 is first opened in the momentum start apparatus, and the clutch K0 is then closed, with the result that the internal combustion engine VM1 and electric machine EM2 are disconnected from one another. Then, a target rotational speed or connection rotational speed or coupling rotational speed is determined on the basis of the sensed driving request, and shifting up of the gearspeeds takes place to a gearspeed which is higher than the gearspeed which is required for the coupling, i.e. for the requested rotational speed, in order to correspond to the driver's wish. The determination of the requested rotational speed is carried out by means of known methods.

Driving requests, which can occur when the exiting of the recuperation phase is triggered, can be an overrun upshift or a traction upshift. In an overrun upshift, that is to say when the brake pedal is released without a request that acceleration is to take place, that is to say, e.g. by non-activation of the accelerator pedal, in the P2 system the clutch K0 is closed with a coupling rotational speed below the target rotational speed of the new gearspeed. In the case of a traction upshift, that is to say in the case of an acceleration request, e.g. as a result of activation of the accelerator pedal, in the P2 system the clutch K0 is closed with a coupling rotational speed above the target rotational speed of the new gearspeed. In the case of the momentum start apparatus, the controlled closing of the clutch, here of the second clutch K1, has to take place first in the fourth step S4, since the clutch K0 has already been completely closed in the third step S3.

For the supported pulse start in order to exit the recuperation phase in the P2 system, the mechanical energy and the kinetic energy (corresponding to the rotational speed difference before and after the shifting up of the gearspeeds) from the pulse of the electric machine EM2 in conjunction with the corresponding transmission component such as the transmission input shaft and the rotating wheelsets etc. and the available torque of the electric machine EM2 are used to start the internal combustion engine VM1. The internal combustion engine VM1 supplies here a negative torque by revving up or tow starting by means of the clutch K0 which closes in a controlled fashion. Therefore, a supported pulse start takes place during an upshift into a gearspeed which is the highest one possible, in order to permit at least largely jolt-free coupling.

The momentum start apparatus can be used to permit completely jolt-free coupling. In this case, the flywheel mass 6 acts as it were as a buffer system between the internal combustion engine VM1 and the electric machine EM2. The coupling therefore does not take place directly via the clutch K0 and the internal combustion engine VM1 but rather via the intermediate step that the internal combustion engine VM1 is connected to the flywheel mass 6 via the clutch K0, and only then does the coupling to the electric machine EM2 take place, with the result that the vibrations of the internal combustion engine VM1 are already damped. For this purpose, a known irregular rotation system, that is to say an irregular rotation damper or a torque superimposition apparatus can be used as the flywheel mass 6. By using a flywheel mass 6, the pulse at the start of the internal combustion engine VM1 can be taken from the system, with the result that jolt-free coupling can take place. In addition, other systems, even systems which are not completely mechanical, can also be used as the flywheel mass.

By means of the proposed method it is possible to achieve more rapid connection of the internal combustion engine VM1 to the output for rapid implementation of driver's wishes at the accelerator pedal, since the internal combustion engine VM1 is already made available when the brake pedal is released, and not only when a request for acceleration is made. At the same time, it is possible to raise the recuperation potentials which arise when the drag torque of the coupled internal combustion engine VM1 does not have to be overcome in braking recuperation phases.

An additional advantage is that even in the P2 system less torque disruption occurs at the transmission output as a result of the slipping transmission in the case of the clutch K0 which closes in parallel with the upshift, with the result that the starting of the internal combustion engine VM1 takes place in a significantly more comfortable way for the driver and less loading acts on the mechanical components. In the case of the momentum start apparatus, the jolt is completely eliminated, and this therefore constitutes an improvement with respect to the P2 system.

Although the method is designed for starting the internal combustion engine VM1 during a braking phase, i.e. when the vehicle is traveling, it can also be used for starting from a stationary state. This applies analogously to the sequence described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for exiting a recuperation phase in a parallel hybrid vehicle, wherein the parallel hybrid vehicle comprises:
   an internal combustion engine,
   an electric machine couplable/decouplable to the internal combustion engine via a first clutch, a flywheel mass and a second clutch, the internal combustion engine being completely decouplable from the electric machine via the first clutch, and
   a transmission connecting the electric machine to a drive train, the method comprising:
   during the recuperation phase, in which the first clutch is open and the internal combustion engine is shut down, increasing a rotational speed of the electric machine;

subsequently opening the second clutch, so as to make the internal combustion engine available for coupling to the electric machine;

while the second clutch is open, closing the first clutch, so as to initiate a pulse start of the internal combustion engine, such that: a target rotational speed between the internal combustion engine and the flywheel mass is set, and, in parallel, a maximum possible gear-speed for connecting to the drive train is set, to satisfy a driving request; and closing the second clutch in a controlled fashion, such that exiting the recuperation phase is complete.

2. The method of claim 1, wherein increasing the rotational speed of the electric machine includes adjusting a transmission gear-speed by one or more downshifts to a gear-speed lower than necessary for recoupling the internal combustion engine.

3. The method of claim 1, wherein the recuperation phase is triggered by activation of a brake pedal of the parallel hybrid vehicle, and the method is triggered by: a reduction in or termination of the activation of the brake pedal, an activation of an accelerator pedal of the parallel hybrid vehicle, or an undershooting of a threshold speed.

4. The method of claim 1, wherein increasing the rotational speed of the electric machine includes adjusting a transmission gear-speed such that a minimum kinetic energy of the electric machine required to implement the pulse start is kept available.

5. A method for exiting a recuperation phase in a parallel hybrid vehicle, wherein the parallel hybrid vehicle comprises:

an internal combustion engine, an electric machine couplable/decouplable to the internal combustion engine via a first clutch, the internal combustion engine being completely decouplable from the electric machine via the first clutch, and a transmission connecting the electric machine to a drive train, the method comprising:

during the recuperation phase, in which the first clutch is open and the internal combustion engine is shut down, increasing a rotational speed of the electric machine;

subsequently controlled closing the first clutch while applying positive torque via the electric machine, so as to initiate a pulse start of the internal combustion engine, such that: a target rotational speed between the internal combustion engine and the transmission is set, and, in parallel, a maximum possible gear-speed for connecting to the drive train is set, to satisfy a driving request; and completing the closing of the first clutch, such that exiting the recuperation phase is complete.

6. The method of claim 5, wherein the controlled closing of the first clutch includes placing the first clutch in a slipping state.

7. The method of claim 6, wherein the complete closing of the first clutch is such that:

when the driving request corresponds to an overrun upshift, the first clutch is closed with a coupling rotational speed between the internal combustion engine and the electric machine below the target rotational speed, and when the driving request corresponds to a traction upshift, the first clutch is closed with the coupling rotational speed above the target rotational speed.

8. The method of claim 6, wherein the pulse start uses kinetic energy from the electric machine, in conjunction with involved transmission components, and available torque of the electric machine.

9. The method of claim 6, wherein increasing the rotational speed of the electric machine includes adjusting a transmission gear-speed by one or more downshifts to a gear-speed lower than necessary for recoupling the internal combustion engine.

10. The method of claim 6, wherein the recuperation phase is triggered by activation of a brake pedal of the parallel hybrid vehicle, and the method is triggered by: a reduction in or termination of the activation of the brake pedal, an activation of an accelerator pedal of the parallel hybrid vehicle, or an undershooting of a threshold speed.

11. The method of claim 6, wherein increasing the rotational speed of the electric machine includes adjusting a transmission gear-speed such that a minimum kinetic energy of the electric machine required to implement the pulse start is kept available.

12. The method of claim 5, wherein the complete closing of the first clutch is such that:

when the driving request corresponds to an overrun upshift, the first clutch is closed with a coupling rotational speed between the internal combustion engine and the electric machine below the target rotational speed, and when the driving request corresponds to a traction upshift, the first clutch is closed with the coupling rotational speed above the target rotational speed.

13. The method of claim 12, wherein the pulse start uses kinetic energy from the electric machine, in conjunction with involved transmission components, and available torque of the electric machine.

14. The method of claim 5, wherein the pulse start uses kinetic energy from the electric machine, in conjunction with involved transmission components, and available torque of the electric machine.

15. The method of claim 5, wherein increasing the rotational speed of the electric machine includes adjusting a transmission gear-speed by one or more downshifts to a gear-speed lower than necessary for recoupling the internal combustion engine.

16. The method of claim 5, wherein the recuperation phase is triggered by activation of a brake pedal of the parallel hybrid vehicle, and the method is triggered by: a reduction in or termination of the activation of the brake pedal, an activation of an accelerator pedal of the parallel hybrid vehicle, or an undershooting of a threshold speed.

17. The method of claim 5, wherein increasing the rotational speed of the electric machine includes adjusting a transmission gear-speed such that a minimum kinetic energy of the electric machine required to implement the pulse start is kept available.

18. A parallel hybrid vehicle comprising:

an internal combustion engine;

an electric machine couplable/decouplable to the internal combustion engine via a first clutch, the internal combustion engine being completely decouplable from the electric machine via the first clutch;

a transmission connecting the electric machine to a drive train;

at least one sensor configured to detect triggering events for entering and exiting a recuperation phase;

a vehicle controller configured to control the parallel hybrid vehicle, in response to the detection of the triggering events, to enter and exit the recuperation phase, wherein exiting the recuperation phase is according to at least the following:

during the recuperation phase, in which the first clutch is open and the internal combustion engine is shut down, increasing a rotational speed of the electric machine;
subsequently controlled closing the first clutch while applying positive torque via the electric machine, so as to initiate a pulse start of the internal combustion engine, such that: a target rotational speed between the internal combustion engine and the transmission is set, and, in parallel, a maximum possible gear-speed for connecting to the drive train is set, to satisfy a driving request; and
completing the closing of the first clutch, such that exiting the recuperation phase is complete.

19. A parallel hybrid vehicle comprising
an internal combustion engine;
an electric machine couplable/decouplable to the internal combustion engine via a first clutch, a flywheel mass and a second clutch, the internal combustion engine being completely decouplable from the electric machine via the first clutch;
a transmission connecting the electric machine to a drive train;
at least one sensor configured to detect triggering events for entering and exiting a recuperation phase;
a vehicle controller configured to control the parallel hybrid vehicle, in response to the detection of the triggering events, to enter and exit the recuperation phase, wherein exiting the recuperation phase is according to at least the following:
during the recuperation phase, in which the first clutch is open and the internal combustion engine is shut down, a rotational speed of the electric machine is increased;
the second clutch is subsequently opened, so as to make the internal combustion engine available for coupling to the electric machine;
while the second clutch is open, the first clutch is closed, so as to initiate a pulse start of the internal combustion engine, such that: a target rotational speed between the internal combustion engine and the flywheel mass is set, and, in parallel, a maximum possible gear-speed for connecting to the drive train is set, to satisfy a driving request; and
the second clutch is closed in a controlled fashion, such that exiting the recuperation phase is complete.

* * * * *